Figure 1:
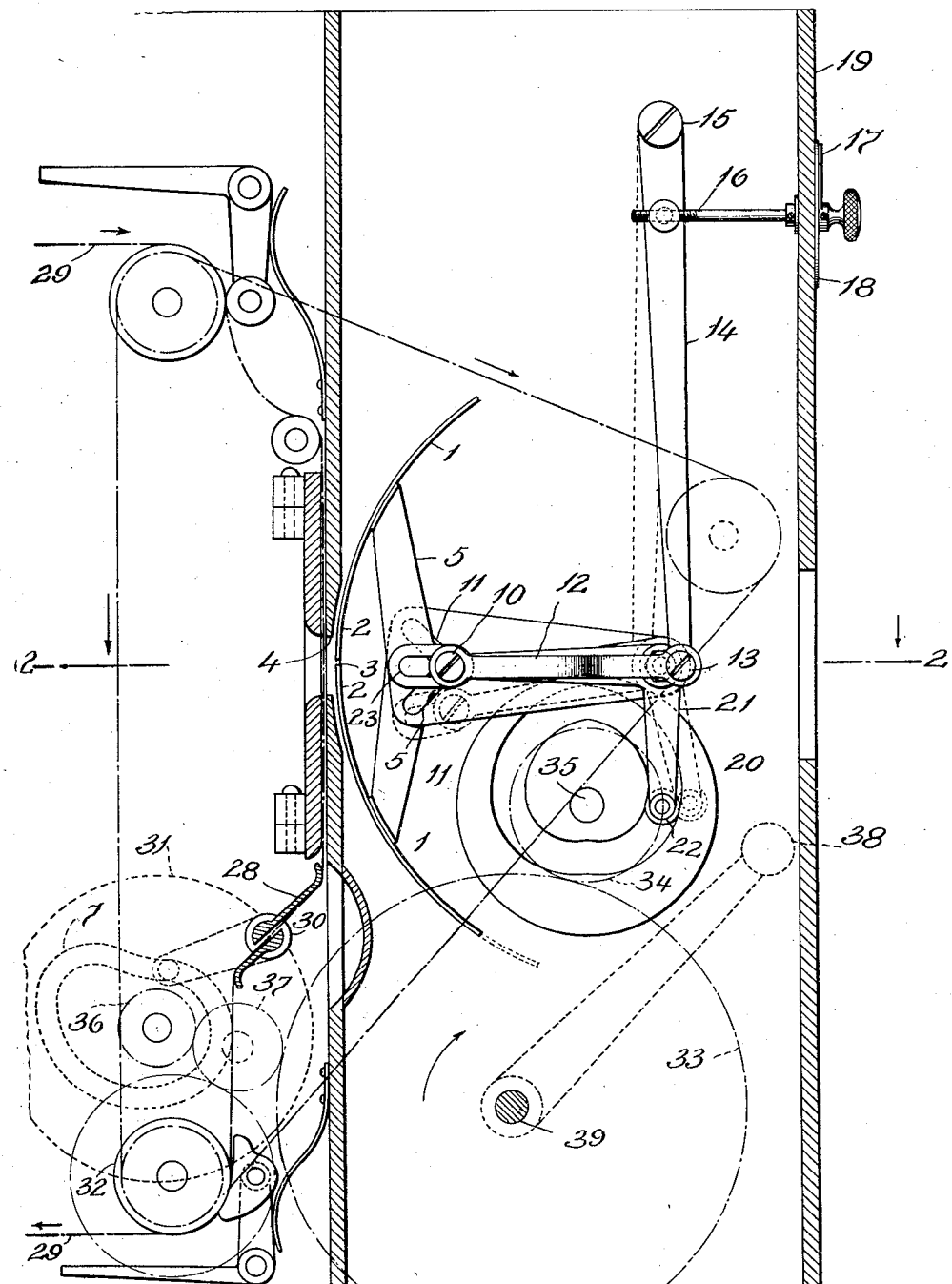

J. A. CAMERON.
SHUTTER FOR MOVING PICTURE MACHINES.
APPLICATION FILED MAR. 10, 1911.

1,151,760.

Patented Aug. 31, 1915.
3 SHEETS—SHEET 1.

Witnesses:
Teresa V. Lynch
Harvey W. Chapman

Inventor
James A. Cameron
By his Attorneys
Brock Beeken &c.

J. A. CAMERON.
SHUTTER FOR MOVING PICTURE MACHINES.
APPLICATION FILED MAR. 10, 1911.
1,151,760.
Patented Aug. 31, 1915.
3 SHEETS—SHEET 2.
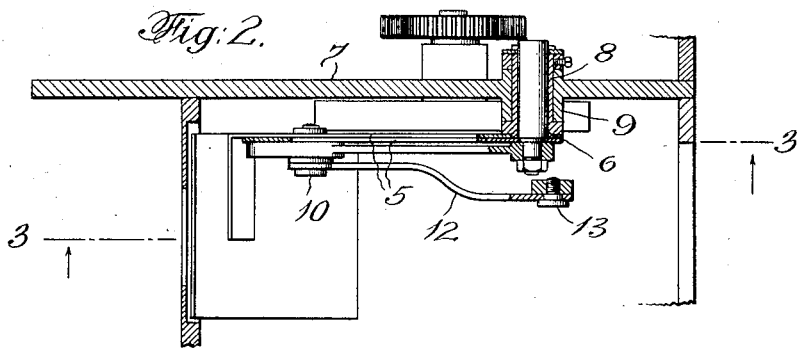
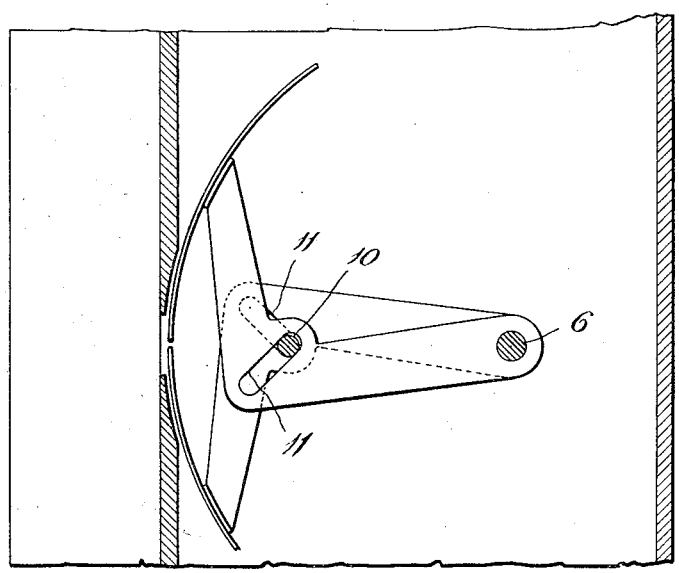
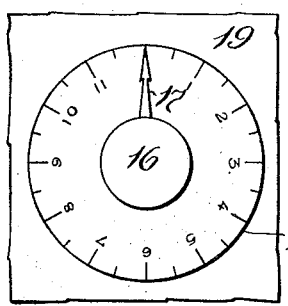
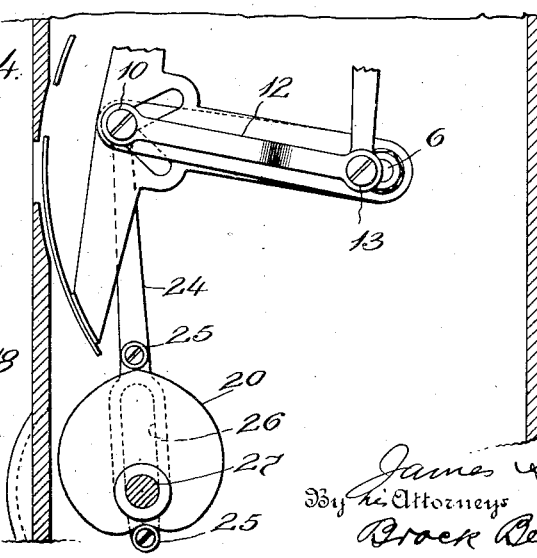

J. A. CAMERON.
SHUTTER FOR MOVING PICTURE MACHINES.
APPLICATION FILED MAR. 10, 1911.

1,151,760.  Patented Aug. 31, 1915.
3 SHEETS—SHEET 3.

Witnesses:
Teresa V. Lynch.
Harvey W. Chapman

Inventor
James A. Cameron
By his Attorneys
Brock Beeken & Smith

UNITED STATES PATENT OFFICE.

JAMES A. CAMERON, OF NEW YORK, N. Y., ASSIGNOR TO CAMERON PICTURE MACHINE COMPANY, A CORPORATION OF NEW YORK.

SHUTTER FOR MOVING-PICTURE MACHINES.

1,151,760.  Specification of Letters Patent.  Patented Aug. 31, 1915.

Application filed March 10, 1911. Serial No. 613,495.

*To all whom it may concern:*

Be it known that I, JAMES A. CAMERON, a citizen of the United States, and a resident of the borough of Brooklyn, in the county of Kings, city and State of New York, have invented certain new and useful Improvements in Shutters for Moving-Picture Machines, of which the following is a specification.

I have found in practice that in the taking or photographing of moving pictures, better results are obtained when the pictures are exposed progressively or gradually, instead of all at once. The shutter of my present invention is of this so-called "progressive exposure" type.

One object of my invention is to improve and simplify shutters of this character and another more specific object is to render the shutter adjustable to suit varying light conditions—and furthermore, to accomplish this adjustment independently of the regular movement of the shutter.

Accordingly, my invention, in a preferred form, consists of a pair of shutter blades which have their adjacent edges spaced apart to provide a light aperture between them, together with means for moving the blades bodily as a unit, past the exposure opening of the machine. And the shutter is preferably so timed with respect to the intermittently acting means that the said means will advance the film twice to each complete cycle of operation of the shutter, whereby the shutter which preferably partakes of a vibrating motion, will act to expose one picture upon one stroke and another picture upon its return stroke.

In addition to the foregoing, the invention consists of means for adjusting the shutter blades toward and away from each other to vary the size of the light aperture between the blades. This means may consist of a connecting pin engaging in two intersecting slots in the arms which carry the shutter blades, which pin, when adjusted, serves to move the arms and the blades carried thereby, toward or away from each other.

Another feature of my invention consists in vibrating the shutter past the exposure opening of the machine at a uniformly constant speed—this, as contradistinguished from the irregular, jerky motion obtained by the crank mechanism usually employed with shutters of the vibrating type.

Various other objects and features of the invention will appear as the specification proceeds.

In the accompanying drawings I have illustrated several preferred embodiments of my invention, but it will be understood that many changes and modifications may be made therein without departing from the spirit and scope of the invention.

Figure 8:
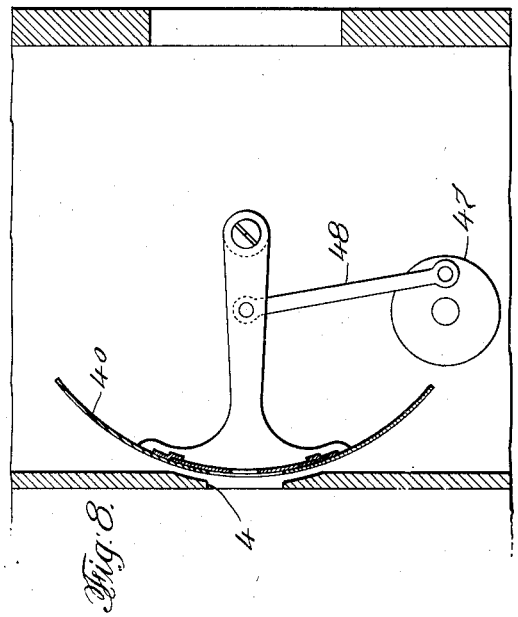
Figure 9:
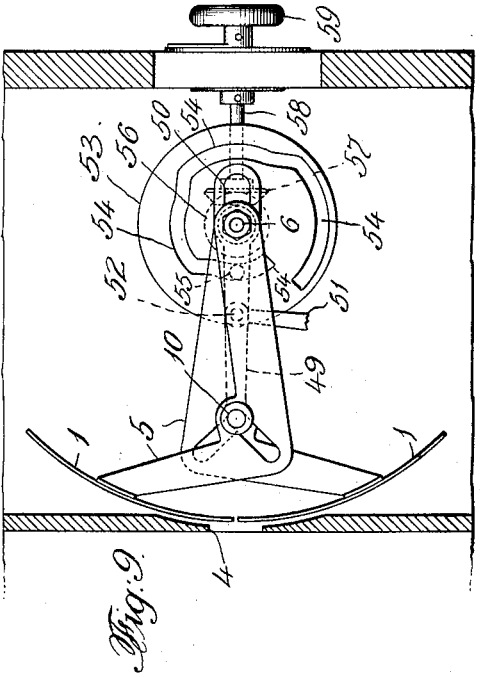
Figure 6:
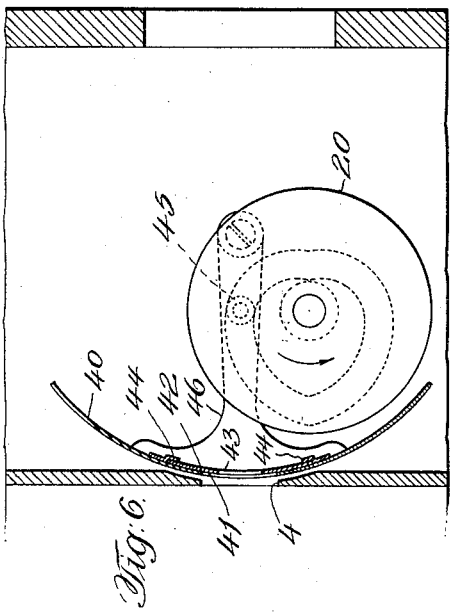
Figure 7:
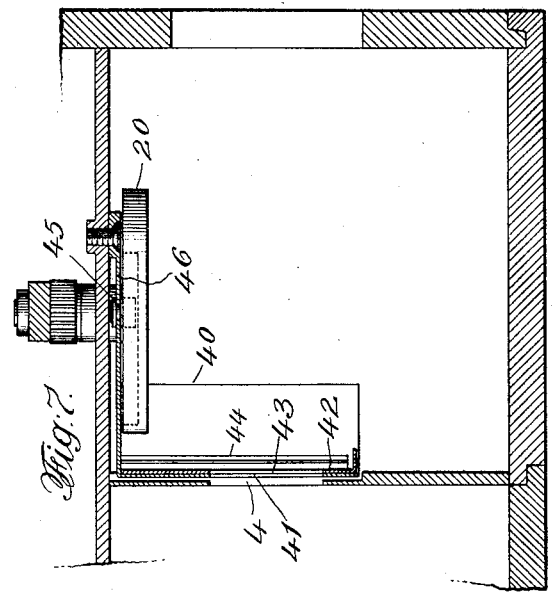

In the drawings: Figure 1 is a view, partly in elevation and partly in section, of a shutter embodying my invention as applied to a moving picture camera. Fig. 2 is a horizontal sectional view of the same taken on the line 2—2 of Fig. 1. Fig. 3 is another sectional view, taken on the line 3—3 of Fig. 2. Fig. 4 is a detail view, with parts in section, showing the shutter blades adjusted to produce a different sized light aperture, and with a slightly different form of shutter operating means. Fig. 5 is a detail view of a form of device for indicating the relative size of the light aperture in the shutter. Figs. 6 and 7 are side and plan views respectively of a somewhat more simplified form of my shutter. Parts are shown in section in both these views. Fig. 8 is a view, partly in section, of the shutter like the one shown in Figs. 6 and 7, except that here a crank is utilized for imparting the movement to the shutter. Fig. 9 is a view in elevation of a form of my shutter like the one shown in the first four figures, illustrating a slightly different form of mechanism for adjusting the size of the light aperture.

My invention is of particular adaptability to the cameras for taking the pictures and I have so illustrated it in the drawings herewith, but I would have it understood that the invention as a whole, and the various features thereof, may equally as well be adapted to the projector for exhibiting the pictures. I have therefore used the term "moving picture machines" as comprehending either the camera for taking the pictures or the projector for exhibiting the same. The claims are to be construed accordingly.

Like reference characters refer to like parts throughout the several views.

The invention as illustrated in the first four figures consists of a pair of shutter blades 1, arranged with their adjacent edges 2 spaced apart so as to provide a light aperture 3 therebetween. These two blades are supported so as to be bodily movable as a unit past the exposure opening 4 of the machine, and for this reason they may be and preferably are carried by a pair of shutter arms 5 which arms are preferably pivoted to rock on a common center 6. One method of so mounting the two shutter blades is clearly shown in Fig. 2, wherein it will be noted that one of the shutter arms (the one nearest the supporting partition or wall 7) is carried by a sleeve 8 which is journaled to freely rotate within the bearing 9, while the other shutter arm is carried by a pivot concentrically located within the sleeve 8 (which pivot I have denominated 6 since it forms the common center for the two blades).

The shutter arms are connected together in some way so as to cause the two blades to move in unison. A preferred form of connection is illustrated in Figs. 1, 3 and 4 wherein is shown a connecting pin 10 engaging in two intersecting slots 11 in the shutter arms. The reason for causing these slots to intersect or cross each other, is that when the pin 10 is adjusted either toward or away from the center of pivotal support, the pin working in these intersecting slots will cause the shutter blades to be either spread apart or to be drawn closer together. A connecting pin therefor is preferably supported in such a way that it may be adjusted inward or outward in the slots to vary the size of the light aperture. For this reason it may be carried by a link 12 which, as shown in the first four figures, has a center of pivotal support 13 substantially in alinement with the center of support of the shutter. The means for directly accomplishing the adjustment of the connecting pin may be varied, but as shown in the first figure, this means may consist of a depending lever 14 which carries the center of support 13 for the link 12, which in turn may itself be adjusted about its own center of pivotal support 15 by means of a screw 16.

It is desirable to provide some means for indicating the relative size of the light aperture without the necessity of opening the machine to see the position of the shutter blades with respect to each other. This means may be provided very easily by providing the adjusting screw 16 with a finger or pointer 17 registering on a dial 18 on the outside of the camera casing 19.

Any desired means may be utilized for vibrating the shutter to carry the light aperture therein past the exposure opening. I prefer to use for this purpose, however, a constant motion cam, such as that illustrated at 20 in Figs. 1, 4 and 6. The active portion of this cam is designed on a substantially regular, or in other words, a constantly progressive curve, from which it will be obvious that the shutter actuated by such a cam will be moved to carry the light aperture therein past the exposure opening at a constant rate of speed. This is not true of a crank motion for in such a case the motion is least at the beginning and end of the stroke and greatest at an intermediate part of the stroke. With a crank motion, therefore, the exposure at the top and the bottom of the picture would be comparatively slow, while the exposure of the middle portion of the picture would be relatively quick. The crank motion is used to a considerable extent and I may elect to use it myself, but where accurate work is needed, the constant movement just described is very desirable. The connections from the cam to the shutter may take many forms. For instance, in Fig. 1 this connection is in the form of a bell crank 21 carrying at one end a cam roller 22 in engagement with the constant movement cam and carrying at its opposite end a slot yoke 23 engaging over the connecting pin 10. A slight modification of this is shown in Fig. 4, wherein a connecting rod 24 engages at its upper end with the connecting pin 10, while at its lower end said rod carries a pair of cam rollers 25 engaging with the periphery of the constant motion cam 20. The lower portion of the connecting is slotted as at 26, so as to engage over and be guided by the cam shaft 27.

Any desired means may be used for intermittently advancing the film past the exposure opening. In Fig. 1 I have shown this means in the form of an oscillator 28, through which the film 29 passes, this so-called oscillator or oscillating member being rocked upon its center of support 30, as by means of a cam 31, so that in conjunction with the take-up roller 32, it will intermittently jerk down a picture-length of the film past the exposure opening.

The intermittent film advancing means and the shutter are preferably so timed that the film will be advanced twice to each cycle of operation of the shutter, so that in this way the shutter will expose one picture upon its movement in one direction and the next succeeding picture upon its return movement in the opposite direction. The shutter is therefore timed to operate at half the speed of the intermittent film advancing means. A suitable form of gearing for accomplinshing this result is indicated in Fig. 1, the same consisting of a main drive gear 33, meshing directly with a pinion 34 on the shaft 35 of the shutter cam, which pinion 34 is of twice the size and therefore rotates at half the speed of the pinion 36, connected with the cam 31, this latter pinion being also driven from the main drive gear, as by means of an intermediate gear or idler 37. The main drive gear may be operated in the usual way by means of a crank 38 engaged on the shaft 39 thereof, or a motor or other devices may be used for imparting the desired movement to the parts.

For studio work where the light may be kept substantially constant, the size of the light aperture in the shutter need not necessarily be made adjustable independently of the movement of the shutter. I have therefore shown in Figs. 6, 7 and 8 a simpler form of shutter which will answer most requirements for studio work. The shutter shown in these views consists of a single shutter blade 40, having a comparatively large light aperture 41 therein, the size of which may be regulated by means of slides 42 having a light opening 43 therein of the desired size. These slides are detachably carried by the shutter, as by being engaged beneath the clips 44. Slides of this sort having two different sizes of light openings therein are illustrated in Figs. 6 and 8 respectively. A cam of the constant motion type is also illustrated in Figs. 6 and 7. A very simple means of connection between the cam and the shutter is illustrated in these views, this consisting simply of a cam roll 45 carried by the shutter arm 46 and engaging in the groove of the cam.

The shutter illustrated in Fig. 8 is the same as the one just described, except that here a crank disk 47 and a connecting rod 48 are utilized for imparting the oscillating movement to the shutter.

It will be obvious with the adjusting means illustrated in Figs. 1 to 4, that unless the center of support 13 for the connecting and adjusting pin corresponds exactly with the center of support of the shutter blades, there will be a slight creeping or opening and closing tendency of the shutter blades with respect to each other during the vibrating or oscillating movement thereof. To overcome this tendency I have designed a means for adjusting the size of the light aperture, whereby said aperture when once so adjusted will remain of a constant size regardless of the vibratory movement of the blades. One form of means for this purpose is illustrated in Fig. 9. Here the link 49 which carries the connecting pin 10 is slotted or forked as at 50 on its inner end, so as to be slidingly engaged over the center of pivotal support 6 of the shutter blades. A connecting rod or like medium 51 serves to impart motion from the cam, crank or other shutter operating means to the shutter blades, the connecting rod in this case being pivoted at 52 to the link 49. By reason of this arrangement the pivotal center of the link always corresponds to the pivotal center of the shutter blades, no matter what the inward and outward adjustment of the link and the connecting pin carried thereby. The link may be shifted to adjust the connecting pin in the intersecting slots by any suitable means. These means are shown in the present instance as consisting of a rotatable member 53 having arcuate slot portions 54 therein adapted to receive a guiding pin 55 on the link. This slotted member is adjusted by any suitable means, such as the intermeshing bevel gears 56—57 on the member 53 and the rotatable adjusting rod 58 respectively. It will be obvious that when this rod is turned, as by means of a hand-wheel 59, the member 53 will be turned to bring one of the arcuate slot portions 54 into engagement with the guiding pin 55 on the link, thereby shifting the link inward or outward as the case may be. When once so adjusted, the guiding pin 55 oscillates idly within that one of the arcuate slot portions which it happens to be in at that time.

When the connecting pin is shifted toward or away from the pivot center of the shutter to adjust the size of the light aperture, the stroke of the shutter arms, and hence the speed of movement of the shutter blades, are varied more or less. This varying of the speed of movement of the shutter blades is an advantage since I am enabled thereby to secure a final adjustment to regulate the exposure. In the forms illustrated in Figs. 1 to 4, the connecting pin is adjusted outwardly in the intersecting slots to spread the blades farther apart, and increase the size of the light aperture. On account of this increased radius from the pivot center of the shutter to the connecting pin 10, the shutter blades will be moved at a slower rate of speed. Hence when the light aperture is increased in size, the speed of movement of the shutter is decreased and vice versa, when the light aperture is made smaller the speed of movement of the shutter is increased. By thus adjusting the size of the light aperture and at the same time the speed of exposure, exactly the desired timing of the shutter and of the exposure may be obtained.

What is claimed, is:

1. A moving picture machine provided with an exposure opening, and a shutter associated with said exposure opening comprising a pair of shutter blades with their adjacent edges spaced apart to constitute a light aperture therebetween, means for bodily vibrating said shutter blades past the exposure opening, and means for intermittently advancing the film twice to each complete vibratory movement of the shutter.

2. A shutter for moving picture machines comprising two shutter blades pivoted on a common center with their adjacent edges spaced apart to constitute a light aperture therebetween, means for adjusting said blades toward and away from each other to vary the size of the light aperture, and means for bodily oscillating the shutter blades about the said common center.

3. In combination with a moving picture machine provided with an exposure opening, a shutter comprising a pair of shutter blades pivoted on a common center, with their adjacent edges spaced apart to provide a light aperture therebetween, means for bodily oscillating the shutter blades on the common center to carry the light aperture past the exposure opening, and means for adjusting the blades toward and away from each other during the movement thereof to vary the size of the light aperture.

4. A shutter for moving picture machines comprising shutter arms pivoted on a common center, shutter blades carried by said arms, means for bodily oscillating the arms and the blades carried thereby, and an adjustable connection between the arms for varying the distance between the blades.

5. A shutter for moving picture machines, comprising shutter arms pivoted on a common center and provided with intersecting slots, shutter blades carried by the said arms, a connection located in the intersecting slots, means for adjusting said connection to vary the distance between the shutter blades, and means for oscillating the arms and the blades carried thereby.

6. A shutter for moving picture machines comprising a pair of shutter blades pivoted on a common center, with their adjacent edges spaced apart to provide a light aperture therebetween, means for bodily oscillating the shutter blades on the said common center, and means for adjusting the blades toward and away from each other to vary the size of the light aperture and to change the speed of movement of the shutter.

7. A shutter for moving picture machines comprising a pair of shutter blades pivoted on a common center, with their adjacent edges spaced apart to provide a light aperture therebetween, means for bodily oscillating the shutter blades on the said common center, and means for changing the speed of movement of the shutter.

8. A shutter for moving picture machines comprising a pair of shutter blades pivoted on a common center, with their adjacent edges spaced apart to provide a light aperture therebetween, means for bodily oscillating the shutter blades on the said common center, and means for adjusting the blades toward each other to decrease the size of the light aperture and at the same time to increase the speed of movement of the shutter.

9. A shutter for moving picture machines comprising a pair of shutter blades pivoted on a common center, with their adjacent edges spaced apart to provide a light aperture therebetween, means for bodily oscillating the shutter blades on the said common center, and means for adjusting the blades away from each other and simultaneously decreasing the speed of movement of the shutter.

10. In a moving picture machine provided with an exposure opening, a shutter associated with said exposure opening consisting of a pair of shutter blades with their adjacent edges spaced apart to provide an exposure opening therebetween, means for vibrating the shutter blades to carry the light aperture past the exposure opening, means for adjusting the blades toward and away from each other to vary the size of the light aperture, and means for indicating the relative position of the shutter blades with respect to each other.

11. A moving picture machine provided with an exposure opening, and a shutter associated with said exposure opening comprising a pair of shutter blades with their adjacent edges spaced apart to constitute a light aperture therebetween, and means for bodily vibrating said shutter blades past the exposure opening at a constant speed of movement.

12. In a camera, co-acting oscillating shutters and means for adjusting the relation of said shutters, said means slidably connected to said shutters.

13. In a camera, co-acting oscillating shutters and means for simultaneously adjusting the relation of said shutters while in operation.

14. In a camera, a pair of oscillating shutter blades mounted upon a common axis, said blades being spaced apart and a common means for adjusting said blades while in operation.

15. In a camera, a pair of shutter blades mounted upon a common axis, said blades being spaced apart and a common means for adjusting said blades, said means adapted to simultaneously adjust said blades.

16. In a camera, oscillating shutters and means for adjusting the relation of said shutters, said means slidably connected to said shutters and adapted to separate and bring together said shutters.

17. In a camera, oscillating shutters and means for adjusting the relation of said shutters, said means slidably connected to said shutters and adapted to separate and bring together said shutters, slots in said shutters and a pin operating in said slots.

18. In a camera, oscillating shutters and means for adjusting the relation of said shutters, said means slidably connected to said shutters and adapted to separate and bring together said shutters, slots in said shutters and a pin operating in said slots, a rod connected to said pin for operating said shutters.

19. In a moving picture machine, two shutter blades pivoted on a common center and mounted on arms having intersecting slots, means for bodily oscillating said blades on said common center, a pin engaged in the intersecting slots of the shutter arms, and a movable member having a pivoted extension engaging the said pin for shifting the pin in the intersecting slots, whereby the blades can be adjusted with relation to each other when the movable member is moved.

20. A shutter for moving picture machines comprising a pair of shutter blades having their edges spaced apart to provide a light aperture between them, said shutter blades being mounted to move in unison in the same direction, an adjusting member, and a slot and pin connection between said member and the shutter blades whereby said blades may be adjusted with respect to each other to vary the size of the light aperture.

21. In a moving picture camera, a casing having an exposure opening, a pair of shutter blades spaced apart to provide a light aperture between them and mounted to move in unison in the same direction, means for adjusting the shutter blades with respect to each other to vary the size of the light aperture, means for oscillating said shutter blades past the exposure opening, and means for varying the speed of movement of the shutter blades with respect to the movement of the other parts of the camera.

22. In a moving picture machine, two shutter blades pivoted on a common center, means for bodily oscillating said shutter blades on said common center, a connection between the shutter blades, means for adjusting said connection whereby the blades are brought nearer together or moved farther apart, and means for varying the speed of the oscillation of the shutter blades with respect to the movement of the other parts of the machine.

23. In a moving picture camera, a casing having an exposure opening, two shutter blades pivoted on a common center and spaced apart to provide a light aperture between them, means for bodily oscillating said shutter blades to move the light aperture past the exposure opening, and means for simultaneously changing the speed of oscillation of the shutter blades and adjusting the blades with respect to each other to vary the size of the light aperture.

24. In a moving picture machine provided with an exposure opening, means for intermittently advancing the film past the exposure opening, a shutter, means for moving said shutter past the exposure opening, and means for varying the speed of movement of said shutter with respect to the movement of the other parts of the machine.

25. In a moving picture machine provided with an exposure opening, means for intermittently advancing the film past said exposure opening, a pivoted shutter, means for oscillating said shutter in front of the exposure opening, and means for varying the speed of oscillation of the shutter with respect to the movement of the other parts of the machine.

Signed at New York city in the county of New York and State of New York this 28 day of Feby A. D. 1911.

JAMES A. CAMERON.

Witnesses:
LAURA E. SMITH,
PHILIP S. McLEAN.